(12) United States Patent
Lu

(10) Patent No.: US 6,641,914 B2
(45) Date of Patent: Nov. 4, 2003

(54) HDPE LABEL FILM

(75) Inventor: Pang-Chia Lu, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/867,723

(22) Filed: May 29, 2001

(65) Prior Publication Data

US 2002/0192466 A1 Dec. 19, 2002

(51) Int. Cl.$^7$ ................................................ B32B 27/32
(52) U.S. Cl. ........................ 428/355 AC; 447/480; 447/516; 447/523; 447/910; 264/901
(58) Field of Search .................. 428/355 AC, 480, 428/447, 516, 500, 523, 910; 264/901

(56) References Cited

U.S. PATENT DOCUMENTS

| | | | |
|---|---|---|---|
| 4,377,616 A | 3/1983 | Ashcraft et al. | 428/213 |
| 4,870,122 A | 9/1989 | Lu | 524/488 |
| 4,898,787 A | 2/1990 | Min et al. | 428/480 |
| 4,916,025 A | 4/1990 | Lu | 428/516 |
| 5,070,164 A | 12/1991 | Min et al. | 526/286 |
| 5,494,745 A * | 2/1996 | Vander Velden et al. | 428/354 |
| 5,660,922 A * | 8/1997 | Herridge et al. | 428/214 |
| 5,662,985 A | 9/1997 | Jensen et al. | 428/195 |
| 5,789,123 A * | 8/1998 | Cleckner et al. | 430/18 |
| 5,885,721 A | 3/1999 | Su et al. | 428/516 |
| 5,888,648 A | 3/1999 | Donovan et al. | 428/349 |
| 5,972,496 A | 10/1999 | Bader et al. | 428/331 |
| 5,981,079 A | 11/1999 | Mount, III et al. | 428/461 |
| 5,985,075 A | 11/1999 | Freedman | 156/229 |
| 6,004,682 A | 12/1999 | Rackovan et al. | 428/518 |
| 6,013,353 A | 1/2000 | Touhsaent | 428/203 |
| 6,025,059 A | 2/2000 | McGee et al. | 428/219 |
| 6,040,027 A | 3/2000 | Freeman | 428/40.1 |
| 6,048,608 A | 4/2000 | Peet et al. | 428/315.5 |
| 6,074,762 A | 6/2000 | Cretekos et al. | 428/516 |
| 6,077,602 A | 6/2000 | Liestman et al. | 428/327 |
| 6,099,927 A * | 8/2000 | Freedman | 428/40.1 |
| 6,127,032 A | 10/2000 | Kelch et al. | 428/335 |
| 6,136,439 A | 10/2000 | Coburn | 428/409 |
| 6,150,013 A | 11/2000 | Balaji et al. | 428/220 |
| 6,322,894 B1 | 11/2001 | Harley et al. | 428/447 |

FOREIGN PATENT DOCUMENTS

| | | |
|---|---|---|
| EP | 1055715 | 11/2000 |
| WO | 93/10007 | 5/1993 |
| WO | 98/14491 | 4/1998 |

OTHER PUBLICATIONS

Property Data Sheets, Knovel.com.*

* cited by examiner

Primary Examiner—Robert Dawson
Assistant Examiner—Christopher M Keehan
(74) Attorney, Agent, or Firm—Rick F. James

(57) ABSTRACT

A multi-layered thermoplastic label comprising: a core layer comprising high density polyethylene (HDPE) wherein said core layer has a first side and a second side; a first skin layer comprising a thermoplastic material wherein said skin layer has a first side and a second side and the second side of the first skin layer is adjacent to the first side of the core layer; wherein said thermoplastic label is oriented in at least one direction.

20 Claims, 1 Drawing Sheet

HDPE LABEL FILM

BACKGROUND OF THE INVENTION

The present invention relates to plastic adhesive labels for glass and plastic substrates and plastic adhesive films suitable for making such labels comprising polyethylene. Labels of the present invention can be applied to glass or plastic containers such as bottles and jars prior to the filling of the containers and can survive rinsing, filling, and pasteurization operations as well as consumer end-use applications (e.g. immersion in an ice chest), or can be applied after the containers have been filled.

Currently, most glass and plastic containers are labeled with paper labels. These paper labels can not withstand the processes that the containers must go through. Thus, to avoid damage to the paper labels, the paper labels are applied to a container after the processing steps (i.e., "post-applied"). Generally, printed paper labels are post-applied to filled containers using aqueous adhesives or hot melt adhesives.

If post-applied paper labels are not completely adhered to the bottle, are misaligned on the bottle, or are otherwise incorrectly applied to the filled bottle, then the entire container and contents will be unusable and must be discarded. Thus, it is desired that containers be labeled and inspected prior to being filled to avoid discarding the contents of containers along with those containers requiring discard due to defective labels.

It is known in the art to use certain high performance acrylic pressure sensitive adhesives to pre-apply plastic labels to containers following container formation at a container manufacturing plant. Examples include Optiflex labels (available from and a trademark of Flexcon), Clear Advantage labels (available from and a trademark of Avery), and Primeline label films (available from and a trademark of the Polykote Corporation). These labels can generally withstand the container processing operations at a container filling plant. Thus, these labels have overcome some of the deficiencies of a post-applied label.

However, the high performance acrylic pressure sensitive adhesives are costly. Labels made using high performance acrylic adhesives generally cost 3–5 times as much as paper labels. This increased cost inhibits widespread market acceptance.

It is also known in the art to use oriented polypropylene and polyethylene terepthalate pressure sensitive labels to apply to containers. These materials have worked well due to their stiffness and clarity, however these materials tend to be difficult to cut into specific shapes. On occasion, edge stringers or insufficient edge cut have been observed.

Film compositions including polyethylene are known in the art. U.S. Pat. No. 6,150,013 discloses an in-mold label film comprising at least two layers with one layer being a heat seal layer for bonding the film to a polymer substrate wherein the film has a thermal conductivity of less than about $1.250 \times 10^{-4}$ k-Cal/sec cm° C. The invention further includes a process for in-mold labeling comprising the steps of forming a label comprising at least two layers with one layer being a heat seal layer for bonding the film to a plastic substrate wherein the film has a thermal conductivity of less than about $1.250 \times 10^{-4}$ k-Cal/sec cm ° C., inserting the label into a mold for producing the plastic substrate with an inside and outside surface thereafter forming a plastic substrate in the mold with sufficient heat wherein the outside surface of the substrate bonds with the heat seal layer of the label. U.S. Pat. No. 6,150,013 is incorporated herein by reference in its entirety.

U.S. Pat. No. 6,136,439 discloses a monolayer printable polymeric film and method for making the film. The film is formed by mixing a structural material, such as polypropylene or polyethylene, with a printable material, such as vinyl-acetate or methacrylate, to form a unitary mixture prior to processing. The unitary mixture is extruded and heated so as to cause the printable material to bloom to the surface of the unitary mixture. Stretching of the mixture at temperatures greater than permissible for multi-layered films formed of separate structural and printable materials heat sets and relaxes or stress relieves the film that is formed. The result is a monolayer film that is stiffer and that lays much flatter than the prior multi-layered films that were prone to curling. The mixture is preferably heated to 270° F. or greater during the stretching process. U.S. Pat. No. 6,136,439 is incorporated herein by reference in its entirety.

U.S. Pat. No. 6,127,032 discloses a multilayer film useful for making plastic adhesive labels for glass substrates such as glass bottles. The multilayer films contain a base layer, an adhesive layer, and optionally an intermediate layer to improve interlayer bonding between the base layer and the adhesive layer. The adhesive layer comprises a heat-activated thermoplastic adhesive that is not tacky at room temperature. Films of the present invention are sufficiently non blocking at room temperature so as to not require the use of a separate release liner. The film can be utilized in conventional graphics printing operations and made into labels. Labels made from films of the present invention can be thermally adhered to glass substrates and exhibit sufficient adhesion to glass substrates to withstand washing/rinsing, filling, and pasteurization processes utilized in the bottling industry. U.S. Pat. No. 6,127,032 is incorporated herein by reference in its entirety.

U.S. Pat. No. 6,004,682 discloses an oriented polymeric in-mold label film that comprises a hot-stretched, annealed, linerless self-wound film lamina and has a face layer for printing and a base layer which includes a heat-activatable adhesive. The heat-shrinkability of the film is balanced thickness-wise to minimize curl and allow the film to be printed in conventional label-printing presses. An antistat may be included only in the charge for the base layer which includes the heat-activatable adhesive. In the manufacture of labelled blow-molded containers, sheets and labels formed from the film may be handled at high speeds while maintaining accurate registration and dimensional and positional integrity even in the absence of any reinforcing backing, yet the labels perform well on deformable containers such as shampoo bottles. U.S. Pat. No. 6,004,682 is incorporated herein by reference in its entirety.

U.S. Pat. No. 5,985,075 discloses a film-forming means that is coextruded to form all plastic multilayer liners and facestocks for pressure-sensitive labels, tapes, decals, signs, bumper stickers, and other products formed from sheet and roll stock. The film materials of the layers of the constructions are selected according to the cost/benefit characteristics of candidate materials considering the functional or operational requirements of the layer in question. U.S. Pat. No. 5,985,075 is incorporated herein by reference in its entirety.

U.S. application Ser. No. 09/307,011 discloses a matte surface film comprising: (a) a base layer comprising high density polyethylene (HDPE); and (b) a matte surface layer comprising a blend of two or more incompatible polyolefins. In preferred embodiments, the matte surface layer comprises (i) a propylene homopolymer or propylene interpolymer and (ii) an ethylene homopolymer or ethylene interpolymer. The film possesses easy and improved cuttability and may be used for packaging and label applications. U.S. application Ser. No. 09/307,011 is incorporated herein by reference in its entirety.

SUMMARY OF THE INVENTION

The present invention provides multilayer plastic films that are particularly suited for manufacturing plastic labels for glass and plastic substrates. Films of the present invention exhibit a number of properties that make them particularly suitably for manufacture into labels for glass and plastic substrates.

Films of the present invention generally comprise a base layer and an adhesive layer bonded to the base layer. The adhesive layer may be bonded directly to the base layer or an intermediate tie layer may be used between the base layer and the adhesive layer to improve interlayer bonding between the base layer and the adhesive layer.

Plastics which can usefully comprise the base layer include high density polyethylene ("HDPE"). Preferably, the base layer in films and labels of the present invention is made of oriented high density polyethylene ("OHDPE").

In another embodiment of the present invention, multilayer films of the present invention can be printed on and cut into adhesive labels for adhering to glass and plastic containers. Adhesive labels of the present invention can be laminated with pressure to glass and plastic bottles.

Advantages of the invention include one or more of the following:
- a film that exhibits sufficient tensile strength, modulus, tear resistance and flatness to allow it to be easily handled in a graphics printing operation;
- a film that exhibits sufficient adhesion to printing ink such that the ink is not wiped, peeled, or abraded off of the film surface during the printing operation;
- a film that exhibits excellent adhesion to glass and plastic substrates;
- a film that will adhere to glass and plastic and provide a water and moisture resistant bond to the substrate;
- a film that exhibits good surface printability, as is, treated, or through surface coating;
- a film that exhibits sufficient stiffness for die cut and dispensing;
- a film that exhibits adhesive compatibility so that it can be used in a PSA sandwich structure;
- a film that is clear;
- a film that is white;
- a film surface that is smooth;
- a film surface that is matte;
- a film that exhibits good ink registration for printing multi-color;
- a film that exhibits water/moisture resistance;
- a film that is difficult to tear.

DETAILED DESCRIPTION OF THE DRAWINGS

Referring now to the accompanying FIGS. 1–4, the present invention is illustrated in its various aspects.

Figure 1:
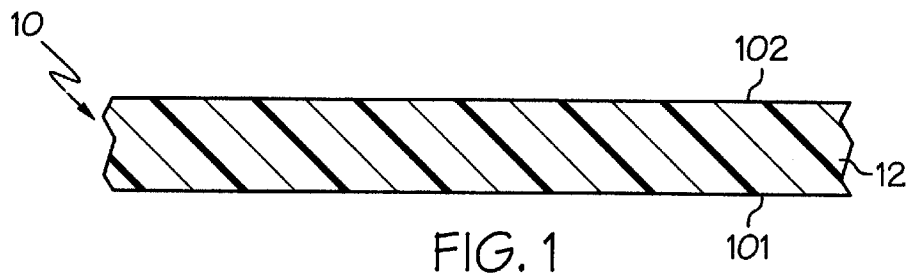
FIG. 1 is a cross-sectional view of a thermoplastic label constructed in accordance with the present invention and comprising a first skin layer as previously described.

Referring first to FIG. 1 depicts a thermoplastic label 10 which consists of a first skin layer 12 comprising a thermoplastic having a first side 101 and a second side 102.

In one embodiment the thermoplastic of the first skin layer 12 is a homopolymer polypropylene. Suitable polypropylenes can include a standard film grade isotactic polypropylene or a high crystalline polypropylene.

In another embodiment the thermoplastic of the first skin layer 12 is a high density polyethylene. Other suitable thermoplastics for the first skin layer 12 include polypropylene, polyethylene, polybutene, olefin copolymers, and blends thereof. Species of these thermoplastics such as high density polyethylene, linear low density polyethylene, ultra low density polyethylene, and linear low density ethylene copolymerized with less than about 10% by weight of another alpha-olefin such as propylene and butene may also be used. Also contemplated are copolymers of polyolefins including block copolymers of ethylene and propylene, other ethylene homopolymers, copolymers and terpolymers, or blends thereof. Other suitable thermoplastics include, but are not limited to, halogenated polyolefins, polyesters such as polyalkylene terephthalates including polybutylene terephthalate, polyethers, and polyamides such as nylon, and isotactic polypropylene having an isotacticity index of at least about 80% by weight, preferably about 95 to 100%, as measured by determining the amount of insolubles in xylene.

In one embodiment the label 10 has thickness from about 0.5 mil. to about 10 mils. In another embodiment, the label 10 has thickness from about 1.0 mils. to about 5 mils. In another embodiment, the label 10 has a thickness less than about 1.5 mils., in another embodiment, the label 10 has a thickness less than about 1.25 mils., in another embodiment, the label 10 has a thickness less than about 1.0 mils., and in another embodiment, the label 10 has a thickness less than about 0.9 mils. In another embodiment, the label 10 is uniaxially oriented. In another embodiment, the label 10 is biaxially oriented.

In one embodiment the first skin layer 12 of the thermoplastic label 10 comprises at least about 15 percent by weight of the thermoplastic label 10. In another embodiment the first skin layer 12 comprises at least about 30 percent by weight of the thermoplastic label 10.

Figure 2:
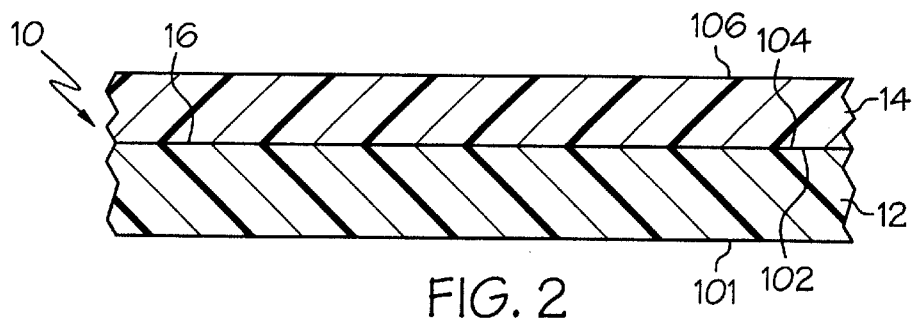
FIG. 2 is a cross-sectional view of the thermoplastic label of FIG. 1, with a core layer added.

Referring now to FIG. 2 is a cross sectional view of the thermoplastic label 10 of FIG. 1 with a core layer 14 added. The thermoplastic label 10 has a first skin layer 12 having a first side 101 and a second side 102 a core layer 14 having a first side 104 and a second side 106 and an interface 16 between the first skin layer 12 and the core layer 14 where the interface is the connection of the second side 102 of the first skin layer 12 and the first side 104 of the core layer 14.

In one embodiment, the core layer 14 comprises polyethylene and, optionally, a cavitating agent. The cavitating agent can be one of the following: polyamides, polybutylene terephthalate, polyesters, acetals, acrylic resins, solid preformed glass spheres, hollow preformed glass spheres, metal beads, metal spheres, ceramic spheres, calcium carbonate ($CaCO_3$), COC's, or other cavitating agents, and mixtures thereof. COC's (cyclic olefin polymers and cyclic olefin copolymers) are described in U.S. Pat. No. 6,048,608 issued to Peet, et at.; this patent is incorporated herein by reference in its entirety. In another embodiment, the core layer 14 is not cavitated. In another embodiment, the polyethylene of the core layer 14 is high density or high crystalline polyethylene.

In general, the HDPE of the core layer 14 that may be used in the present invention has a density of about 0.940 to about 0.980 g/cm3, a melting point of about 115 to about 140° C., and a melt index of about 0.5 to about 12 g/10 minutes (measured in accordance with ASTM D1238 under a load of 2.16 kg at 190° C.). Most preferably, the HDPE contained in the base layer has a density of about 0.950 to about 0.970 g/cm3, a melting point of about 120 to about 134° C., and a melt index of about 1 to about 6 g/10 minutes. In one embodiment, the core layer 14 comprises at least about 50% by weight of HDPE, in another embodiment, the core layer 14 comprises at least about 75% by weight of HDPE, and in a third embodiment, the core layer 14 comprises at least about 90% by weight of HDPE. In one embodiment, the core layer 14 comprises at least about 50% by weight of the thermoplastic label 10, in another embodiment, the core layer 14 comprises at least about 75% by weight of the thermoplastic label 10, and in a third embodiment, the core layer 14 comprises at least about 90% by weight of the thermoplastic label 10.

Particularly useful HDPE polymers for producing the core layer 14 include, but are not limited to, HDPE M-6211 and HDPE M-6030 sold by Lyondell Chemical Company, HD-6704.67 sold by ExxonMobil Chemical Company, and the like.

In another embodiment a second skin layer (not shown) is added to the thermoplastic label 10 that is adjacent to the core layer 14 and is adjacent to the second side 106 of the core layer 14. In one embodiment, the second skin layer (not shown) comprises a thermoplastic. Some exemplary thermoplastics include polypropylene, polyethylene, polybutene, olefin copolymers, and blends thereof. Species of these thermoplastics such as high density polyethylene, linear low density polyethylene, ultra low density polyethylene, and linear low density ethylene copolymerized with less than about 10% by weight of another alpha-olefin such as propylene and butene may also be used. Also contemplated are copolymers of polyolefins including block copolymers of ethylene and propylene, other ethylene homopolymers, copolymers and terpolymers, or blends thereof. Other suitable thermoplastics include, but are not limited to, halogenated polyolefins, polyesters such as poly-alkylene terephthalates including polybutylene terephthalate, polyethers, and polyamides such as nylon, and isotactic polypropylene having an isotacticity index of at least about 80% by weight, preferably about 95 to 100%, as measured by determining the amount of insolubles in xylene.

In another embodiment a primer is added to the second skin layer (not shown). In another embodiment, the second skin layer (not shown) has a metal or coating layer applied. U.S. Pat. Nos. 6,077,602; 6,013,353; 5,981,079; 5,972,496; 6,074,762; 6,025,059; and 5,888,648 disclose the use of coatings and/or metal layers on a film, and are incorporated herein by reference. In one embodiment, suitable coatings may include PVdC's or acrylics which serve to boost gloss, enhance machineability, and/or enhance ink adhesion; suitable metals may include aluminum.

Figure 3:
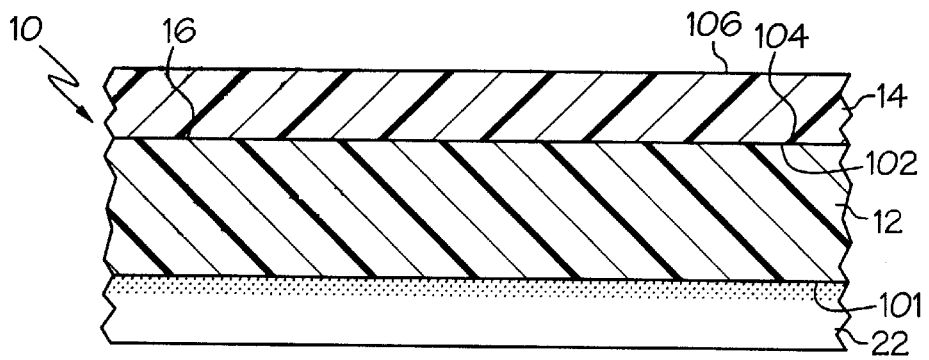
FIG. 3 is a cross-sectional view of the thermoplastic label of FIG. 2, with an adhesive applied to the first skin layer.

Referring now to FIG. 3 is a cross sectional view of the thermoplastic label 10 of FIG. 2 with an adhesive 22 applied to the first side 101 of the first skin layer 12. The adhesive 22 may be pressure-sensitive or nonpressure-sensitive, and may be a wax, a resin, or an elastomer such as, for example, a natural or synthetic wax, an acrylic or vinyl acetate resin, a styrene-butadiene or isoprene elastomer, or mixtures thereof.

In one embodiment a coating or treatment may be applied to the first side 101 of the first skin layer 12 so that the adhesive 22 is anchored to the first skin layer 12. U.S. Pat. No. 5,662,985 discloses the use of adhesive anchors and is incorporated herein by reference in its entirety.

In another embodiment, pressure sensitive adhesives can comprise the adhesive 22. Pressure sensitive adhesives which permit adhesion without the application of heat are well known. One particular class of pressure sensitive adhesive 22 is disclosed in U.S. Pat. Nos. 4,898,787 and 5,070,164, both of which are incorporated herein by reference. This adhesive 22 is prepared from emulsion polymerization of a lower alkyl acrylate, such as ethyl acrylate, a lower alkyl methacrylate, such as methyl methacrylate and an acid such as acrylic acid. A pressure sensitive adhesive is generally tacky at room temperature, and it may need to be used in conjunction with a separate release liner or film (e.g., a silicone release liner). Other exemplary pressure sensitive adhesives include: 1) terpolymers of ethylene, about 1 to 30% by weight of an alpha, beta-ethylenically unsaturated carboxylic acid comonomer, and about 1 to 40% by weight of either a vinyl ester or an alkyl ester of an alpha, beta-ethylenically unsaturated carboxylic acid; 2) terpolymers of ethylene, 1–30% by weight of either a vinyl ester or an alkyl ester of an alpha, beta-ethylenically unsaturated carboxylic acid, and 1–4% maleic anhydride; 3) maleic anhydride-modified ethylene copolymers and terpolymers; and 4) organosilane-modified ethylene copolymers and terpolymers. These resins may be used alone to comprise the adhesive layer or any combination of resins may be blended to comprise the adhesive layer.

In another embodiment, non-pressure sensitive adhesives can comprise the adhesive 22. Non-pressure sensitive adhesives generally consist of solid base materials in combination with water. In one embodiment, the adhesive 22 is an aqueous solution of a natural adhesive (e.g. casein). In another embodiment, the adhesive 22 is an aqueous solution of a resin (e.g. PVA, EVA). Non-pressure sensitive adhesives are widely used as an alternative to wrap around or pressure sensitive labels. Some adhesives are a colloidal suspension of various proteinaceous materials in water and are derived by boiling animal hides, tendons, or bones which are high in collagen. Alternatively, an adhesive can be derived from vegetables (e.g. starch, dextrin). Some adhesives are based on synthetic materials (resins). (Suitable non-pressure sensitive adhesives include H B Fuller WB 5020, National Starch Cycloflex 14–200A, AABBITT 712-150, and Henkel 10-7026; the aforementioned list of adhesives are trademarks of H B Fuller, National Starch, AABBITT, and Henkel respectively.)

Figure 4:
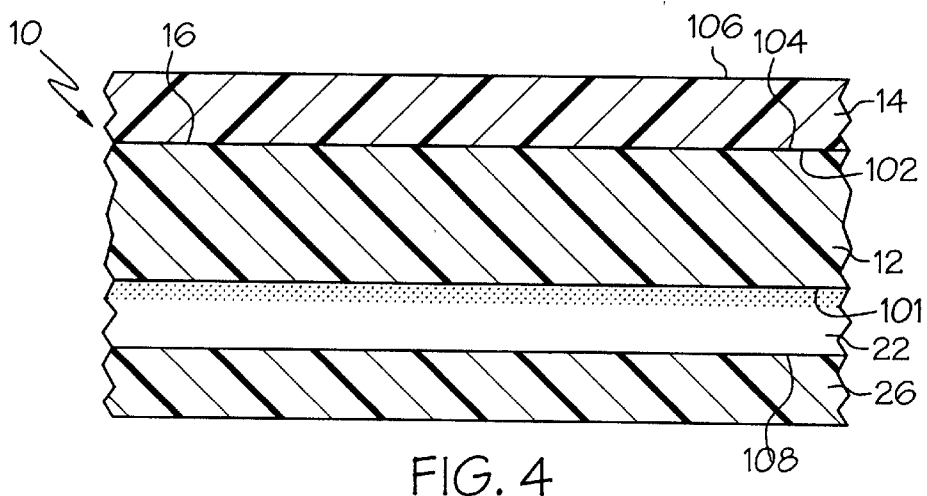
FIG. 4 is a cross-sectional view of the label shown in FIG. 3, as attached to a container.

Referring now to FIG. 4 is a cross sectional view of the label 10 shown in FIG. 3 as attached to a container 26.

The container 26 has a surface 108 which is adjacent to the adhesive 22 applied to the first side 101 of the first skin layer 12 of the label 10. Suitable materials for the container 26 include glass, ceramics, thermoplastics, or other materials.

In another embodiment a conventional filler and pigment such as titanium dioxide may be added to the core layer 14 and may be desirable for printing or graphic reproduction purposes. Generally, from an economic viewpoint at least, it has not been considered to be of any particular advantage to use more than about 10 percent by weight of titanium dioxide to achieve a white label suitable for printing. Greater amounts could be added for greater opacity so long as there is no undue interference with achieving the desired properties of the thermoplastic label 10.

The label 10 can be transparent or opaque. In one embodiment the label 10 is white opaque. For the opaque version, this provides an excellent contrasting background for printed material applied to the second side 106 of the core layer 14 or to the surface (not shown) of the second skin layer (not shown) of the label 10. In one embodiment is a transparent polyethylene core layer 14 which has a coextruded first skin layer 12 and second skin layer (not shown). Another embodiment has a metal coating applied to the second skin layer (not shown). Another embodiment has a glossy finish on the label 10, and another embodiment has a matte finish on the label 10.

Another embodiment has a core layer 14 comprising an opaque core material that is an oriented polyethylene structure cavitated in a special way so as to produce an opaque appearance. A material of this type is described in U.S. Pat. No. 4,377,616, example 3, issued to Ashcraft, et al; this patent is incorporated herein by reference in its entirety. In accordance with this patent, the process of preparing the opaque film structure is as follows: a major proportion of a first thermoplastic material, example polyethylene, is mixed with a minor proportion of a second material of a higher melting point or of a higher glass transition temperature than the first material. This mixture is heated to a temperature of at least above the melting point of the first material. Thereafter, the second material is uniformly dispersed throughout the molten first material in the form of microspheres. The microspheres can be conveniently prepared in a master batch of, e.g. hollow glass beads, micro dispersed in molten polyethylene. This combination is then coextruded with a first skin layer 12 and a second skin layer (not shown) so as to have two skin layers on opposite surfaces of the core 14 comprising a combination of the materials. In one embodiment, thereafter, this arrangement is biaxially oriented, as disclosed in U.S. Pat. No. 5,885,721 incorporated herein by reference, at a temperature and to a degree to form a strata of opacifying closed cell voids of dimensions X, Y and Z. Dimensions X and Y are major dimensions and dimension Z is a minor dimension at least generally corresponding to the diameter of the microspheres. In another embodiment, this arrangement is uniaxially oriented, as disclosed in U.S. Pat. Nos. 4,870,122 and 4,916,025 incorporated herein by reference, at a temperature and to a degree to form a strata of opacifying closed cells voids of dimensions X, Y, and Z. Dimension Z is major dimension and dimensions Y and Z are minor dimensions at least generally corresponding to the diameter of the microspheres. In some cases, it may be advantageous to include inorganic filler materials therein, for example, to promote the roughness of the surface of the skin.

Another embodiment has a core layer 14 comprising an opaque core material that is an oriented polyethylene structure that is cavitated by using COC's (cyclic olefin polymers and cyclic olefin copolymers). COC's are described in U.S. Pat. No. 6,048,608 issued to Peet, et al; this patent is incorporated herein by reference in its entirety.

Another embodiment has a core layer 14 comprising an opaque core material that is a polyethylene structure that contains calcium carbonate.

Another embodiment of the thermoplastic label 10 has one or more tie layers (not shown) adjacent to the second side 102 of the first skin layer 12 and also adjacent to the first side 104 of the core layer 14. The tie layers (not shown) are between the first skin layer 12 and the core layer 14 in the interface 16. In another embodiment the tie layer (not shown) is a mixture of the materials of the first skin layer 12 and the core layer 14. It is also contemplated to have one or more tie layers (not shown) between the core layer 14 and the second skin layer (not shown).

In another embodiment, the first skin layer 12 can delaminate from the thermoplastic label 10. In one embodiment, when the label 10 is removed from the container 26, the first skin layer 12 of the label 10 and the adhesive 22 remain attached to the container 26. This means that the first skin layer 12 has delaminated from the adjacent layers of the label 10.

It should be evident that this disclosure is by way of example, and that various changes can be made by adding, modifying, or eliminating details without departing from the fair scope of the teaching contained in the disclosure. The invention therefore is not limited to particular details of this disclosure except to the extent that the claims that follow are necessarily are so limited. The following examples illustrate the present invention:

EXAMPLE 1

Table 1 illustrates the 12 samples that were used for this example. The composition of each layer of the samples is identified, as well as the thickness, haze, gloss, and cuttability measurements for each sample.

The cuttability test is done with a Milton-Bradley #5112 shear cutter. Specifically, a piece of sample film about 8×8" was placed on the cutting board and cut into 1" strips with normal shearing force. The cut edge was then examined for smoothness. When the film is soft, it can not be cut cleanly. The edge will show finely stretched "strings" or "ticker".

HDPE film is made of coex 3-layer structure. The core layer is HDPE resin having melt index of 1.1 and density 0.958, melting point 130° C. One skin is an EPB terpolymer from Chisso Chemical Co. The other skin can be either the same Chisso EPB terpolymer (for clear film) or a matte resin blend (for matte film).

Single layer HDPE film can also be used as is without skins.

The HDPE films can be uniaxially oriented or biaxially oriented

With HDPE in the film structure, one gets good cuttability, with no edge strings. With OPP film, one gets poor cuttability with numerous fine, short strings at the cut edge. These kind of strings are like when you cut a piece of paper, if the knife is not too sharp, at the cut edge you will get paper dust and rough edge. In label die cutting, this is not acceptable. If one can not get a clean cut, the strings may interfere the cut label to be dispensed during application process.

As a reference, a cereal liner from a Rice Krispy (Trademark of Kelloggs) Cereal box was used and tested. Typically the liner is make of 2-layer coex HDPE film, around 1.5 to 2 mil, either blown or cast, with EVA or EVA blend as the inside heat seal layer. This film gave also quite a few short stringers by the same cutting test.

TABLE 1

| sample # | # of layers in film structure | layer 1 | layer 2 | layer 3 |
|---|---|---|---|---|
| 1 | 3 | 50/50 blend of terpolymer 7510 + PE-1845 | HDPE M-6211 | terpolymer 7510 |
| 2 | 3 | 50/50 blend of terpolymer 7510 + PP-3371 | HDPE M-6211 | terpolymer 7510 |
| 3 | 3 | HDPE M-6030 | HDPE M-6211 | terpolymer 7510 |
| 4 | 3 | 50/50 blend of HDPE-6211 + terpolymer 7510 | HDPE M-6211 | terpolymer 7510 |
| 5 | 3 | 50/50 blend of HDPE-6211 + terpolymer 7510 | HDPE M-6211 | terpolymer 7510 |
| 6 | 3 | terpolymer 7510 | HDPE M-6211 | terpolymer 7510 |
| 7 | 3 | 50/50 blend of HDPE-6211 + terpolymer 7510 | PP-3371 | PP-3371 |
| 8 | 3 | 50/50 blend of HDPE-6211 + terpolymer 7510 | PP-3371 | PP-3371 |
| 9 | 3 | 50/50 blend of HDPE-6211 + terpolymer 7510 | HCPP-9218 | PP-3371 |
| 10 | 3 | 50/50 blend of HDPE-6211 + terpolymer 7510 | HCPP-9218 | PP-3371 |
| 11 | 3 | 50/50 blend of HDPE-6211 + terpolymer 7510 | HCPP-9218 | PP-3371 |
| 12 | 3 | PP-3371 + 10% Sylysia-340 | PP-3371 | PP-3371 |

| sample # | layer 1 gauge micron | layer 2 gauge micron | layer 3 gauge micron | total gauge micron | haze | gloss | cuttability |
|---|---|---|---|---|---|---|---|
| 1 | 1.5 | 26 | 1.5 | 29 | 5.5 | 71 | good |
| 2 | 1.5 | 26 | 1.5 | 29 | 3.5 | 79 | good |
| 3 | 1.5 | 26 | 1.5 | 29 | 4.3 | 78 | good |
| 4 | 1.5 | 26 | 1.5 | 29 | 41 | 23 | good |
| 5 | 1.5 | 35 | 1.5 | 38 | 39 | 23 | good |
| 6 | 1.5 | 26 | 1.5 | 29 | 4 | 78 | good |
| 7 | 1.5 | 25 | 1.5 | 28 | 58 | 14 | poor |
| 8 | 1.5 | 36 | 1.5 | 39 | 62 | 12 | poor |
| 9 | 1.5 | 36 | 1.5 | 39 | 61 | 13 | fair |
| 10 | 1.5 | 25 | 1.5 | 28 | 57 | 15 | fair |
| 11 | 1.5 | 15 | 1.5 | 18 | 58 | 16 | poor |
| 12 | 1.5 | 15 | 1.5 | 18 | 38 | 34 | poor |

HCPP-9218: high crystalline PP resin from Amoco Chemical Co
HDPE M-6211: HDPE resin with density 0.958, MI = 1.1, mp = 130° C. from Lyondell Chemical Co
HDPE M-6030: HDPE resin with density 0.957, MI = 3.0, from Lyondell Chemical Co
PP-3371: PP homopolymer resin with MFR = 3, mp = 162° C. from Fina Chemical Co
terpolymer 7510: EPB terpolymer with MFR = 6, mp = 130 C. from Chisso Chemical Co
PE-1845: Affinity polyolefin plastomer resin from Dow Chemical Co
Sylysia-340: amorphous silica from Fuji Sylysia Chemical, Ltd.

I claim:

1. A multi-layered thermoplastic label comprising:
   (a) a core layer consisting of high density polyethylene (HDPF) and, optionally, one or more of a cavitating agent a filler, and a pigment, wherein said core layer has a first side and a second side;
   (b) a first skin layer comprising a thermoplastic material, wherein said skin layer has a first side and a second side, and the second side of the first skin layer is adjacent to the first side of the core layer;
   wherein said thermoplastic label is uniaxially oriented, said thermoplastic label further comprises an adhesive adjacent to the first side of the first skin layer, said adhesive is the only adhesive of the multi-layered thermoplastic label, and said thermoplastic label, without the adhesive, has a thickness of less than about 1.5 mil.

2. The label of claim 1, wherein the core layer consists of HDPE and has a strata of voids;
   positioned at least substantially within at least a substantial number of each of said voids is at least one spherical void-initiating particle which is phase-distinct and incompatible with a matrix material, the void space occupied by said particle being substantially less than the volume of said void, with one generally cross-sectional dimension of said particle at least approximating a corresponding cross-sectional dimension of said void.

3. The label of claim 1 wherein the adhesive is a pressure-sensitive adhesive.

4. The label of claim 3 wherein the adhesive is an emulsion polymerization of a lower alkyl acrylate, a lower alkyl methacrylate, and acrylic acid.

5. The label of claim 1, wherein the core layer consists of HDPE and a cavitating agent selected from the group consisting of polyamide, polybutylene terephthalate, polyester, acetal, acrylic resin, solid preformed glass sphere, hollow preformed glass sphere metal bead, metal sphere, ceramic sphere, calcium carbonate ($CaCO_3$) COC's, and mixtures thereof.

6. The label of claim 1, wherein the HDPE of said core layer has a density of about 0.940 to about 0.980 $g/cm^3$, a melting point of about 115 to about 140° C., and a melt index of about 0.5 to about 12 g/10 minutes, measured in accordance with ASTM D1238 under a load of 2.16 kg at 190° C.

7. The label of claim 1 wherein the label is die-cut.

8. A multi-layered thermoplastic label comprising:
   (a) a core layer consisting of high-density polyethylene (HDPE) and, optionally, one or more of a cavitating agent, a filler, and a pigment, wherein said core layer has a first side and a second side;
   (b) a first transition layer comprising a thermoplastic material, wherein said first transition layer has a first side and a second side, and the second side of the first transition layer is adjacent to the first side of the core layer;
   (c) a first skin layer comprising a thermoplastic material, wherein the first skin layer has a first side and a second side, wherein the second side of the first skin layer is adjacent to the first side of the first transition layer;

wherein said label is uniaxially oriented, said label further comprises an adhesive adjacent to the first side of the first skin layer, said adhesive is the only adhesive of said label, and said label, without the adhesive, has a thickness of less than about 1.5 mils.

9. The label of claim 8 further comprising a second skin layer comprising a thermoplastic having a first side and a second side wherein the first side of the second skin layer is adjacent to the second side of the core layer.

10. The label of claim 8 further comprising a second transition layer comprising a thermoplastic wherein the second transition layer has a first side and a second side wherein the first side of the second transition layer is adjacent to the second side of the core layer; and comprising a second skin layer comprising a thermoplastic wherein the second skin layer has a first side and a second side wherein the first side of the second skin layer is adjacent to the second side of the second transition layer.

11. The label of claim 8, wherein the core layer consists of HDFE and has a strata of voids;

positioned at least substantially within at least a substantial number of each of said voids is at least one spherical void-initiating particle which is phase-distinct and incompatible with a matrix material, the void space occupied by said particle being substantially less than the volume of said void, with one generally cross-sectional dimension of said particle at least approximating a corresponding cross-sectional dimension of said void.

12. The label of claim 8, wherein the core layer consists of HDPE and a cavitating agent selected from the group consisting of polyamide, polybutylene terephthalate, polyester, acetal, acrylic resin, solid preformed glass sphere, hollow preformed glass sphere, metal bead, metal sphere, ceramic sphere, calcium carbonate (CaCO$_3$), COC's, and mixtures thereof.

13. A pressure-sensitive thermoplastic label lamination comprising:

(a) a coextruded, multi-layered thermoplastic label comprising at least one layer consisting of high-density polyethylene (HDPE) and, optionally, one or more of a cavitating agent, a filler, and a pigment, wherein said label has a first side and a second side;

(b) a pressure-sensitive adhesive layer, wherein said pressure-sensitive adhesive has a first side and a second side, and the second side of the pressure-sensitive adhesive is adjacent to the first side of the thermoplastic label;

(c) a release liner, wherein the release liner layer has a first side and a second side, wherein the second side of the release liner comprises a silicon coating and the second side of the release liner is adjacent to the first side of the adhesive layer;

wherein said label (a) is oriented in at least one direction, said pressure-sensitive adhesive layer (b) is the only adhesive layer of said label lamination, and said label (a) has a thickness of less than about 1.5 mils.

14. A multi-layered thermoplastic label comprising:

(a) a core layer consisting of high density polyethylene (HDPE) and, optionally, one or more of a cavitating agent, a filler, and a pigment, wherein said core layer has a first side and a second side;

(b) a first skin layer comprising a thermoplastic material, wherein said skin layer has a first side and a second side, and the second side of the first skin layer is adjacent to the first side of the core layer; and (c) an adhesive adjacent to the first side of the first skin layer, wherein the adhesive is selected from the group consisting of (i) a pressure-sensitive adhesive selected from the group consisting of an emulsion polymerization of a lower alkyl acrylate, a lower alkyl methacrylate, and an acid; a terpolymer of ethylene, from 1 to 30 wt % of an α,β-ethylenically unsaturated carboxylic acid comonomer, and from 1 to 40 wt % of an α,β-ethylenically unsaturated carboxylic acid; a terpolymer of ethylene, from 1 to 30 wt % of a vinyl ester of an α,β-ethylenically unsaturated carboxylic acid, and from 1 to 4 wt % of maleic anhydride; a terpolymer of ethylene) from 1 to 30 wt % of an alkyl ester of an α,β-ethylenically unsaturated carboxylic acid, and from 1 to 4 wt % of maleic anhydride; a maleic anhydride-modified ethylene copolymer; a maleic anhydride-modified ethylene terpolymer; an organosilane lane-modified ethylene copolymer; and an organosilane-modified ethylene terpolymer, and (ii) a non-pressure sensitive adhesive comprising a solid base material in combination with water;

wherein said thermoplastic label is biaxially oriented, said adhesive (c) is the only adhesive of said label, and said label, without said adhesive (c), has a thickness of less than about 1.5 mils.

15. The label of claim 14, wherein the core layer is a cavitated core layer consisting of HDPE and a cavitating agent selected from the group consisting of polyamide, polybutylene terephthalate, polyester, acetal, acrylic resin, solid preformed glass sphere, hollow preformed glass sphere, metal bead, metal sphere, ceramic sphere, calcium carbonate (CaCO$_3$), COC's, and mixtures thereof.

16. A multi-layered thermoplastic label comprising:

(a) a core layer consisting of high-density polyethylene (HDPE) and, optionally, one or more of a cavitating agent, a filler, and a pigment, wherein said core layer has a first side and a second side;

(b) a first transition layer comprising a thermoplastic material, wherein said first transition layer has a first side and a second side, and the second side of the transition layer is adjacent to the first side of the core layer;

(c) a first skin layer comprising a thermoplastic material, wherein the first skin layer has a first side and a second side, wherein the second side of the skin layer is adjacent to the first side of the first transition layer; and (d) an adhesive adjacent to the first side of the first skin layer, wherein the adhesive is selected from the group consisting of (i) a pressure-sensitive adhesive selected from the group consisting of an emulsion polymerization of a lower alkyl acrylate, a lower alkyl methacrylate, and an acid; a terpolymer of ethylene, from 1 to 30 wt % of an α,β-ethylenically unsaturated carboxylic acid comonomer, and from 1 to 40 wt % of an α,β-ethylenically unsaturated carboxylic acid; a terpolymer of ethylene, from 1 to 30 wt % of a vinyl ester of an α,β-ethylenically unsaturated carboxylic acid, and from 1 to 4 wt % of maleic anhydride; a terpolymer of ethylene, from 1 to 30 wt % of an alkyl ester of an α,β-ethylenically unsaturated carboxylic acid, and from 1 to 4 wt % of maleic anhydride; a maleic anhydride-modified ethylene copolymer; a maleic anhydride-modified ethylene terpolymer; an organosilane-modified ethylene copolymer; and an organosilane-modified ethylene terpolymer, and (ii) a non-pressure sensitive adhesive comprising a solid base material in combination with water;

wherein said label is biaxially oriented, said adhesive (d) is the only adhesive of said label, and said label, without said adhesive (d), has a thickness of less than about 1.5 mils.

17. The label of claim 16, further comprising a second skin layer comprising a thermoplastic having a first side and a second side, wherein the first side of the second skin layer is adjacent to the second side of the core layer.

18. The label of claim 16, further comprising a second transition layer comprising a thermoplastic, wherein the second transition layer has a first side and a second side, wherein the first side of the second transition layer is adjacent to the second side of the core layer; and further comprising a second skin layer comprising a thermoplastic, wherein the second skin layer has a first side and a second side, wherein the first side of the second skin layer is adjacent to the second side of the second transition layer.

19. The label of claim 16, wherein the core layer is a cavitated core layer consisting of HDPE and a cavitating agent selected from the group consisting of polyamide, polybutylene terephthalate, polyester, acetal, acrylic resin, solid preformed glass sphere, hollow preformed glass sphere, metal bead, metal sphere, ceramic sphere, calcium carbonate ($CaCO_3$), COC's, and mixtures thereof.

20. A pressure-sensitive thermoplastic label lamination comprising:

(a) a single-layer thermoplastic label comprising high-density polyethylene, wherein said label has a first side and a second side;

(b) a pressure-sensitive adhesive layer, wherein said pressure-sensitive adhesive has a first side and a second side, and the second side of the pressure-sensitive adhesive is adjacent to the first side of the thermoplastic label;

(c) a release liner, wherein the release liner layer has a first side and a second side, wherein the second side of the release liner comprises a silicon coating and the second side of the release liner is adjacent to the first side of the adhesive layer;

wherein said label (a) is oriented in at least one direction, said pressure-sensitive adhesive layer (b) is the only adhesive layer of said label lamination, and said label (a) has a thickness of less than about 1.5 mils.

* * * * *